United States Patent [19]

Kato et al.

[11] Patent Number: 4,645,044
[45] Date of Patent: Feb. 24, 1987

[54] HYDRAULIC DAMPER OF ADJUSTABLE DAMPING FORCE TYPE

[75] Inventors: Tetsuo Kato; Tomio Imaizumi, both of Kanagawa, Japan

[73] Assignee: Tokico Ltd., Kanagawa, Japan

[21] Appl. No.: 746,772

[22] Filed: Jun. 19, 1985

[30] Foreign Application Priority Data

Jun. 20, 1984 [JP] Japan .............................. 59-91936[U]

[51] Int. Cl.[4] .............................................. F16F 9/34
[52] U.S. Cl. ................................ 188/319; 137/512.15; 137/516.11; 188/322.15; 251/310
[58] Field of Search ........... 188/319, 285, 299, 322.15; 137/512.15, 516.11, 512.1, 614.17, 860; 251/310

[56] References Cited

U.S. PATENT DOCUMENTS

| 1,632,385 | 6/1927 | Vallman ............................ 137/512.1 |
| 3,376,884 | 4/1968 | Bucknell et al. ............ 137/512.15 X |
| 3,882,891 | 5/1975 | Viles et al. ....................... 137/512.15 |

FOREIGN PATENT DOCUMENTS

| 120375 | 9/1979 | Japan ..................................... 188/319 |
| 40034 | 3/1984 | Japan ............................... 188/322.15 |
| 616543 | 1/1949 | United Kingdom ........... 137/512.15 |
| 2123922 | 2/1984 | United Kingdom ................. 188/319 |

*Primary Examiner*—George E. A. Halvosa
*Attorney, Agent, or Firm*—Wenderoth, Lind & Ponack

[57] ABSTRACT

A hydraulic damper of the adjustable damping force type includes a cylinder containing hydraulic liquid therein, a piston working in the cylinder and partitioning the interior thereof into two liquid chambers and having a damping force generating mechanism, a piston rod connected to the piston and extending through one of the liquid chambers to the outside of the cylinder, a coaxial bore formed in the piston rod, a liquid passage communicating the liquid chambers independently from the damping force generating mechanism and including at least a portion of the bore in the piston rod, an adjusting rod inserted into the coaxial bore and operated rotatably from the outside of the damper, and a rotary valve secured to the adjusting rod for selectively changing the effective passage area of the liquid passage. A generally cylindrical orifice tube having a plurality of circumferentially spaced first orifices is provided in a midportion of the liquid passage, the rotary valve slidingly engaging with the inner circumference of the orifice tube. A check valve having a plurality of second orifices normally resiliently engages with the outer circumference of the orifice tube. The second orifices in the check valve are aligned with the first orifices in the orifice tube, with the diameter of each second orifice being smaller than that of a corresponding first orifice.

5 Claims, 6 Drawing Figures

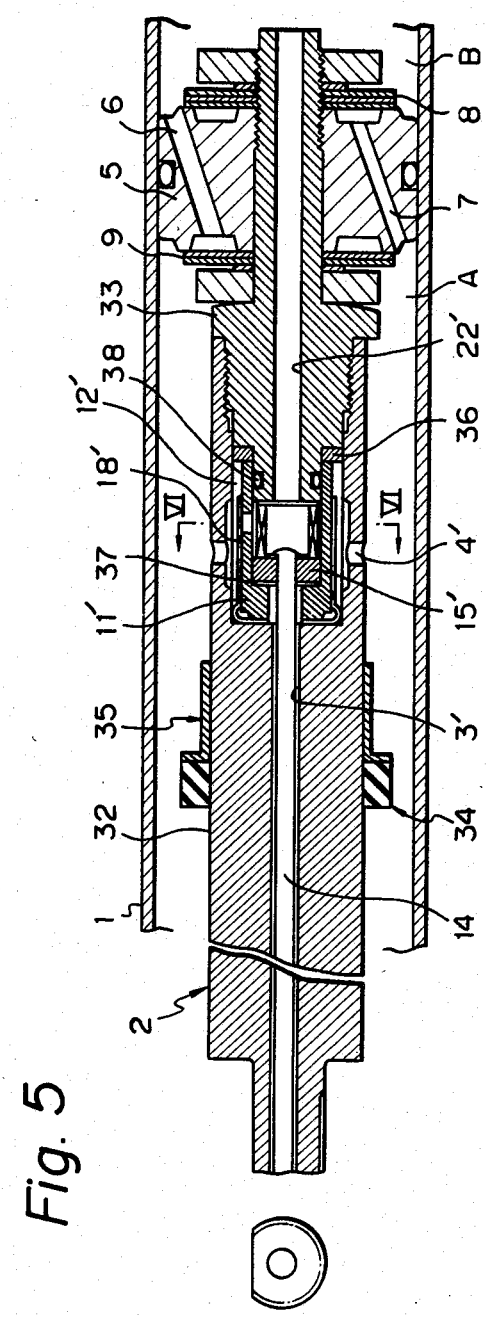
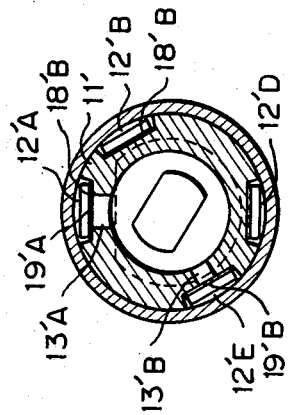
Fig. 5
Fig. 6

HYDRAULIC DAMPER OF ADJUSTABLE DAMPING FORCE TYPE

BACKGROUND OF THE INVENTION

This invention relates to a hydraulic damper of the adjustable damping force type particularly adapted for use in a vehicle such as an automobile.

Various proposals have been made with respect to hydraulic dampers of the adjustable damping force type, since it is preferable to change the damping force characteristics of the hydraulic dampers in a suspension system of a vehicle such as an automobile in response to the running condition of the vehicle, such as running on a rough road, running on a paved road at a relatively low speed, running at a high speed and the like, which can improve driving comfort and steering stability.

This invention relates to a hydraulic damper of the adjustable damping force type including a cylinder containing hydraulic liquid therein, a piston working in the cylinder and partitioning the interior thereof into two liquid chambers, a piston rod connected to the piston and extending through one of said liquid chambers to the outside of the cylinder, a coaxial bore formed in the piston rod, a liquid passage for communicating said liquid chambers and including at least a portion of said bore, an adjusting rod inserted into said coaxial bore and adapted to be operated rotatably from the outside of the damper, and a rotary valve secured to the adjusting rod and being operable from the outside of the damper to selectively change the effective passage area of the liquid passage.

One prior art hydraulic damper of the aforementioned kind further comprises a check valve which is resiliently displaceable in the axial direction. The check valve opens in the contraction stroke of the damper to increase the effective passage area and closes in the extension stroke of the damper.

However, when the check valve is axially displaceably provided, the overall axial length of the damper tends to increase, and when the check valve is provided to cooperate with the rotary valve an axial force will act on the rotary valve, particularly when the check valve is in the closed condition, which increases the operating force of the check valve. Further, the check valve usually consists of a valve body and a coil spring for biasing the valve body against a valve seat which increases the number of parts and complicates manufacturing and assembling operations, thereby increasing costs.

SUMMARY OF THE INVENTION

The object of the present invention is to solve the aforementioned problems and, according to the invention, there is provided a hydraulic damper of the aforementioned kind further comprising a generally cylindrical orifice tube having therein a plurality of circumferentially spaced first orifices and being fixedly provided in a midportion of the liquid passage, the rotary valve being secured to the adjusting rod and slidingly engaging with the inner circumference of the orifice tube, and a check valve having a plurality of circumferentially spaced second orifices and normally resiliently engaging with the outer circumference of the orifice tube, with the second orifices in the check valve being located to align with respective first orifices and the diameters of the second orifices being smaller than the diameters of corresponding first orifices.

According to a preferred embodiment, the check valve radially outwardly displaces against a resilient force in the contraction stroke of the damper to permit the liquid flow determined by either of the first orifices as determined by the rotary valve and, in the extension stroke of the damper, the check valve is urged against the outer circumference of the orifice tube by the resilient force and hydraulic pressure and restricts the liquid flow in the liquid passage by either of the second orifices.

BRIEF EXPLANATION OF THE DRAWINGS

The invention will hereinafter be explained in detail with reference to the drawings exemplifying two preferred embodiments of the invention, in which:

FIG. 5 is a partial longitudinal sectional view of a hydraulic damper according to a second embodiment of the invention; and FIG. 6 is a sectional view taken along line VI—VI in FIG. 5.

DETAILED DESCRIPTION OF THE PREFERRED EMBODIMENTS

FIG. 1–FIG. 4 show a hydraulic damper according to the first embodiment of the invention and which comprises a cylinder 1 containing hydraulic liquid therein, a piston 5 working in the cylinder 1 and partitioning the interior of the cylinder 1 into two liquid chambers A and B, and a piston rod 2 secured to the piston 5 and extending through the liquid chamber A and to the outside of the damper through one end (not shown) of the cylinder 1. The hydraulic damper may be of a single tube type wherein a free piston (not shown) is slidably provided in the cylinder 1 to partition the liquid chamber B from a gas chamber (not shown), or may be of a dual tube type wherein an outer tube (not shown) coaxially encircles the cylinder 1 to define an annular reservoir chamber containing therein pressurized gas and hydraulic liquid.

Figure 1:
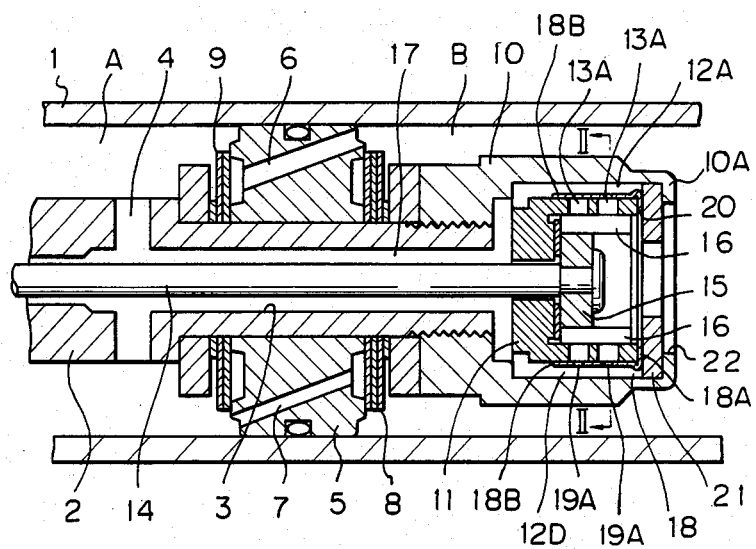
FIG. 1 is a longitudinal sectional view showing the essential portion of a hydraulic damper according to a first embodiment of the invention.

A coaxial bore 3 is formed in the piston rod 2, and at least one radial hole 4 communicates permanently the liquid chamber A with the bore 3. A damping force generating valve mechanism consisting of through holes 6 and 7 axially extending through the piston 5, a disc valve 8 normally preventing liquid flow through the holes 7 (FIG. 1 shows only one hole 7, but a plurality of circumferentially spaced holes 7 is provided), and a disc valve 9 normally preventing liquid flow through the holes 6 are provided on the piston 5 to generate the main damping force during both of the extension and contraction strokes of the damper.

Figure 2:
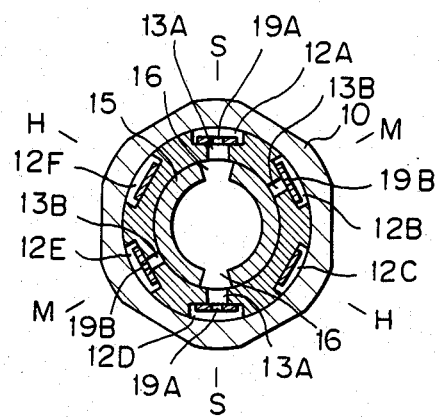
FIG. 2 is a sectional view taken along line II—II in FIG. 1.

A tubular member 10 is screw-threadingly connected to one end of the piston rod 2 and acts also to secure the piston 5 to the piston rod 2. An orifice tube 11 is secured to the inner circumference of the tubular member 10 by such as force fitting and the like. As shown in FIG. 2, six axially extending and circumferentially spaced cutouts 12A, 12B, 12C, 12D, 12E and 12F are formed in the outer circumference of the orifice tube 11 to define respective axially extending liquid passages between the inner circumference of the tubular member 10. Relatively large diameter orifices 13A and 13A are formed in the orifice tube 11 at locations corresponding to cutouts 12A and 12D, and relatively small diameter orifices 13B and 13B are formed in the orifice tube 11 at locations corresponding to cutouts 12B and 12E. These orifices are referred as first orifices 13. The orifices 13 in the illustrated embodiment act to define damping force characteristics during the contraction stroke of the damper as explained in detail hereinafter. It will be understood that the orifices 13A act to define a soft condition and the orifices 13B a medium condition. No orifices are formed at locations corresponding to the cutouts 12C and 12F to define a hard condition.

An adjusting rod 14 extends through the bore 3 in the piston rod 2 to define an annular liquid passage 17 between the bore 3 and adjusting rod 14. One end of the adjusting rod 14 extends into the orifice tube 11 and the other end (not shown) sealingly extends through the bore 3 to the outside of the damper and is connected to a suitable operating device (not shown) such as an electric motor or the like. A rotary valve 15 is secured to the adjusting rod 14 and has a generally cylindrical configuration with one end being closed. Two diametrically opposing and axially extending grooves or cutouts 16 are formed in the circumferential wall of the rotary valve 15, and the rotary valve 15 slidingly engages with the inner circumference of the orifice tube 11. The liquid passage 17 is permanently communicated with the liquid chamber A through the radial hole 4 in the piston rod 2 and is permanently communicated with the outer circumference of the orifice tube 11 at the locations of cutouts 12A through 12F.

Figure 3:
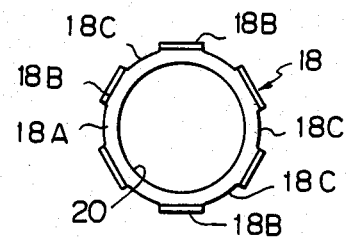
FIG. 3 is a plan view of a check valve shown in FIG. 1.
Figure 4:
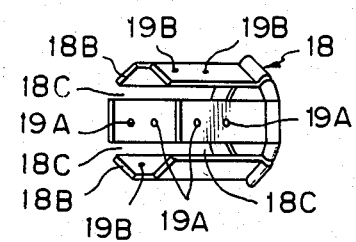
FIG. 4 is a perspective view of the check valve of FIG. 3.

A check valve 18 is provided to cooperate with the outer circumference of the orifice tube 11. As shown in FIGS. 3 and 4, the check valve 18 consists of a generally disc shaped bottom plate 18A having a hole 20 and six elongated plate-like valve bodies 18B which are bent from the outer circumference of the bottom plate to extend orthogonally therefrom at circumferentially equally spaced intervals from each other. A space 18C is formed between each of adjacent valve bodies 18B. The valve bodies 18B cooperate with the outer surfaces of respective cutouts 12A–12F such that the valve bodies normally engage resiliently with the orifice tube 11. A pair of diametrically opposing valve bodies 18B located in cutouts 12A and 12D have relatively large diameter orifices 19A aligned with respective orifices 13A, and a pair of diametrically opposing valve bodies 18B located in cutouts 12B and 12E have relatively small diameter orifices 19B aligned with orifices 13B in the orifice tube 11. The orifices 19A and 19B are respectively smaller than the orifices 13A and 13B. As will be explained hereinafter the orifices 19A and 19B define damping force characteristics during the extension stroke of the damper and have respective diameters smaller than the orifices 13A and 13B which define damping force characteristics during the contraction stroke of the damper. The orifices 13A and 19A define the soft condition S—S, and the orifices 13B and 19B define the medium condition M—M. A pair of remaining valve bodies 18B have no orifices to define a hard condition H—H. In the illustrated embodiment, two axially spaced orifices 19A or 19B are formed in respective valve bodies 18B, as shown in FIG. 4, to correspond with respective orifices 13 in the orifice tube 11.

A bottom cap 21 having a relatively large diameter central opening is secured to the tubular member 10 by such as caulking and the like and acts to locate the orifice tube 11, the check valve 18 and the rotary valve 15 in the tubular member 10. The check valve 18 and the orifice tube 11 are located such that the orifices 13A and 19A are axially and radially aligned and the orifices 13B and 19B are axially and radially aligned and that the valve bodies 18B normally engage resiliently with outer surfaces of respective cutouts 12A–12F.

The operation of the first embodiment of the invention will now be explained.

Firstly, the adjusting rod 14 is operated from the outside of the damper to rotate the rotary valve 15 to locate the grooves 16 in the rotary valve 15 at predetermined positions, e.g., the soft position S—S as shown in FIG. 2.

Assuming that the damper is in the extension stroke and the speed of the piston 5 is relatively low, then the liquid in the liquid chamber A flows into the liquid chamber B through the radial hole 4, the annular axial passage 17, the passages defined by cutouts 12A and 12D, orifices 19A and 13A, the grooves 16, and the opening 20. The valve bodies 18B are tightly pressed against the outer surfaces of the cutouts in the orifice tube 11 by hydraulic pressure. Thus, the orifices 19A act to generate damping force since the orifices 19A are smaller than orifices 13A. When the speed of the piston 5 exceeds a predetermined speed, the disc valve 8 opens to generate a predetermined damping force.

During the contraction stroke of the damper, the liquid in the liquid chamber B flows into the liquid chamber A through the opening 20 in the valve body 18, the cutout grooves 16, the orifices 13A, spaces between the outer surface of the orifice tube 11 and the valve bodies 18B which are radially outwardly displaced by the hydraulic pressure acting on the valve bodies 18B having orifices 19B therein, the passage defined by cutouts 12A and 12D, the annular axial passage 17 and the radial hole 4. The orifices 13A act to generate the damping force. When the speed of the piston 5 exceeds a predetermined level, the disc valve 9 opens to generate the damping force in cooperation with the orifices 13A.

When the adjusting rod 14 is rotated by 60 degrees in the clockwise direction as viewed in FIG. 2 from the aforementioned soft condition S—S to the medium condition M—M, the damper acts similarly to generate damping forces corresponding to the medium condition.

Further, when the adjusting rod 14 is further rotated by 60 degrees in the same direction to locate the rotary valve 15 at the hard condition H—H, liquid does not flow through the passage 17 and the damping force characteristics are determined by the disc valves 8 and 9.

FIGS. 5 and 6 show a second embodiment wherein the adjustable damping force generating mechanism is disposed within the piston rod remote from both of the liquid chambers A and B, which arrangement makes it possible to suppress noisy sounds accompanied by the liquid flow flowing through the orifices.

The piston rod 2 consists of two screw-threadingly secured members 32 and 33, and the piston 5 is connected to a small diameter tip end portion of the piston rod member 33. The piston rod member 32 has therein a coaxial stepped bore 3' with the adjusting rod 14 extending through the small diameter portion of the bore 3'. A generally tubular orifice tube 11' is fixedly mounted in the large diameter portion of the bore 3'. A rotary valve 15' is secured to the tip end of the adjusting rod 14 and slidably engages with the inner circumference of the orifice tube 11'. As shown in FIG. 6, four axially extending and circumferentially spaced cutouts 12'A, 12'B, 12'D and 12'E are formed in the outer circumference of the orifice tube 11' to define liquid passages similar to the first embodiment. These passages are permanently communicated with the liquid chamber A through one or more radial holes 4' formed in the piston rod member 32.

A check valve 18' consists of an annular disc portion clamped between a shoulder between the large and small diameter portions of the stepped bore 3' and an adjacent axial end of the orifice tube 11', and four axially extending and circumferentially spaced valve bodies 18'B integrally connected to the disc portion. The valve bodies 18'B cooperate respectively with the outer circumference of the orifice tube 11' at locations of respective cutouts 12'A, 12'B, 12'D and 12'E. Orifices 13'A and 13'B and orifices 19'A and 19'B are, similarly to the first embodiment, formed respectively in the orifice tube 11' and the valve bodies 18'B.

The interior of the rotary valve 15' is permanently communicated with the liquid chamber B through a coaxial bore 22' in the piston rod member 33. Shown at 36 and 37 in FIG. 5 are washers, at 34 is a cushion member, and at 35 is a support secured to the piston rod member 32 to support the cushion 34.

The operation of the second embodiment is similar to the first embodiment.

As described heretofore, according to the invention, the check valve 18 or 18' is disposed on the outer circumference of the orifice tube 11 or 11' to resiliently expand in the radially outward direction in opening the check valve. Thus, the overall axial length of the damper can be minimized.

Further, even when the hydraulic pressure acts on the check valve during the extension stroke of the damper, to close the check valve, the rotary valve 15 or 15' is not acted upon by the hydraulic pressure, thus making it possible to operate the rotary valve by a relatively small torque.

The check valve 18 or 18' can be formed of sheet metal by such as a press work operation, which improves manufacturing efficiency. Further, the check valve can simply be mounted on the orifice tube by such as clamping and caulking and the like, which makes it possible to reduce manufacturing and assembling costs.

What is claimed is:

1. In a hydraulic damper of the adjustable damping force type including a cylinder containing hydraulic liquid, a piston working in said cylinder and partitioning the interior thereof into first and second liquid chambers, a piston rod connected to said piston and extending through said first liquid chamber to the outside of said cylinder, a coaxial bore formed in said piston rod, a liquid passage communicating said liquid chambers and including at least a portion of said bore, an adjusting rod inserted into said coaxial bore and adapted to be operated rotatably from the outside of the damper, and a rotary valve secured to said adjusting rod and operable thereby from the outside of the damper to selectively change the effective passage area of said liquid passage, the improvement comprising:

a generally cylindrical orifice tube positioned in said liquid passage, said orifice tube having an outer surface having formed therein a plurality of axially extending and circumferentially spaced engaging surface portions, and a plurality of first orifices extending radially through said orifice tube at locations corresponding to at least some of said engaging surface portions;

said rotary valve being positioned within said orifice tube and having an outer surface slidingly engaging an inner surface of said orifice tube, said rotary valve having means for, upon rotation of said rotary valve relative to said orifice tube, opening and closing selected said first orifices; and check valve means for enabling different fluid flows through said liquid passage during movement of said piston in opposite directions, said check valve means comprising a disc-like bottom plate portion positioned adjacent a first axial end of said orifice tube, a plurality of elongated resilient plate-like portions integrally connected to the outer circumference of said bottom plate portion, said plate-like portions extending axially of said orifice tube and resiliently engaging respective said engaging surface portions of said orifice tube, and a plurality of second orifices extending through at least some of said plate-like portions at locations such that each second orifice is aligned with a respective said first orifice, the size of each said second orifice being smaller than the size of the respective aligned first orifice;

whereby upon movement of said piston in a first said direction said plate-like portions resiliently engage said engaging surface portions and liquid flow through said liquid passage is restricted by said second orifices, and upon movement of said piston in a second said direction said plate-like portions are expanded radially outwardly from said engaging surface portions by the pressure of said liquid and liquid flow through said liquid passage is restricted by said first orifices.

2. The improvement claimed in claim 1, wherein said plate-like portions expand radially outwardly to separate from said engaging surface portions during movement of said piston in the contraction stroke of the damper.

3. The improvement claimed in claim 1, further comprising damping force generating disc valve means, mounted on said piston, for generating damping force both in the extension and contraction strokes of the damper.

4. The improvement claimed in claim 1, wherein said orifice tube is located at a position adjacent said second liquid chamber.

5. The improvement claimed in claim 1, wherein said orifice tube is located at a position midway of said bore in said piston rod.

* * * * *